Patented Oct. 25, 1938

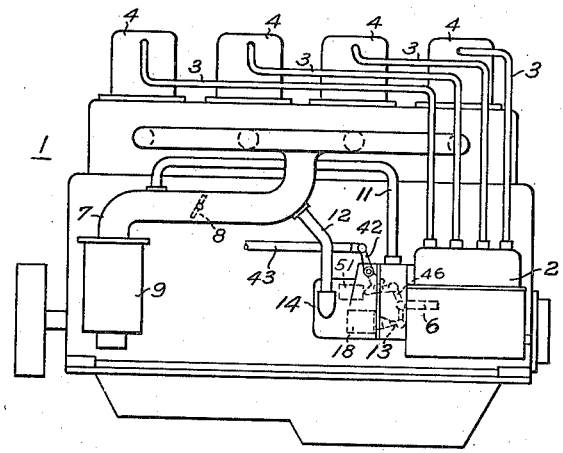

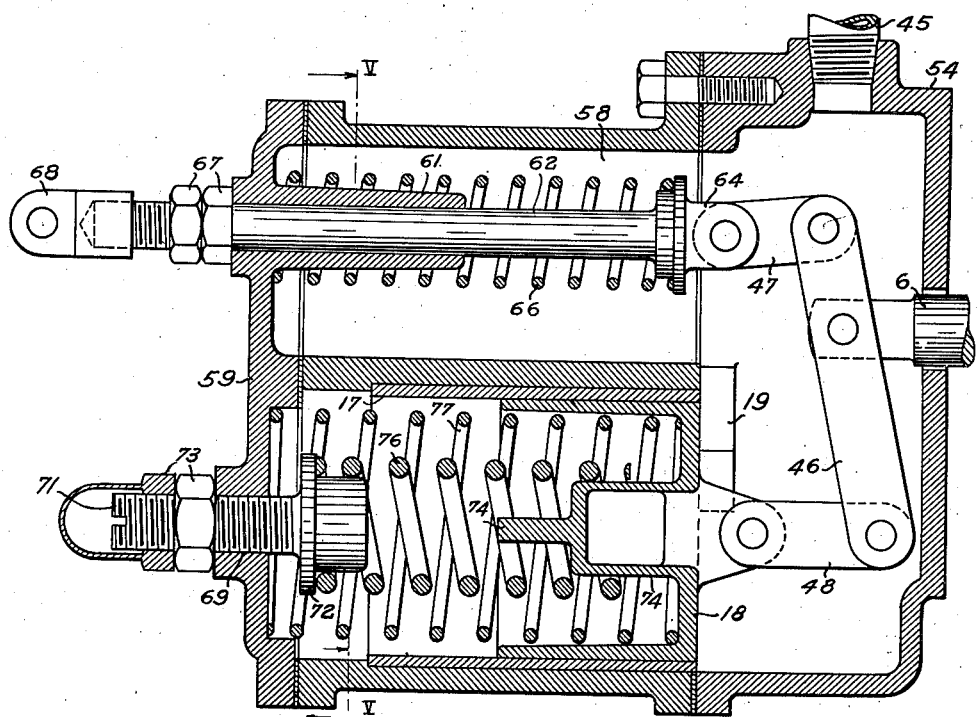

2,134,658

UNITED STATES PATENT OFFICE 2,134,658

VACUUM CONTROL FOR INTERNAL COMBUSTION ENGINES

Walter G. Charley, Wauwatosa, Wis., assignor to Allis-Chalmers Manufacturing Company, Milwaukee, Wis., a corporation of Delaware Application May 20, 1936, Serial No. 80,666

11 Claims. (Cl. 123—140)

This invention relates to the control and regulation of internal combustion engines and more particularly to the manner and means for controlling and regulating the operation of the pumping unit in accordance with variations in vacuum in the intake manifold.

The pumping unit employed in connection with internal combustion engines, particularly those of the Diesel or semi-Diesel types in which the fuel is directly injected into the engine cylinders, generally comprises a reciprocating pump plunger for each engine cylinder which delivers extremely small, metered quantities of fuel in timed relation to the engine cycle; the metering of the fuel being regulated in various ways, such, for example, as by rotating the pump plunger which has a helical groove controlling a bypass or by varying the time during which the suction valve is open or by varying the stroke of the pump plunger.

The regulation of the metering means as heretofore mentioned or in similar ways requires only a slight movement of the control rod or shaft effecting such regulation and, because of the manner in which the control rod or shaft is connected to the vacuum responsive actuating or regulating device, there can be only a slight corresponding movement of the latter. As a result, the regulator is extremely difficult to adjust, is not sensitive and will not, when once adjusted to obtain engine operation with a clean exhaust under a given set of conditions, maintain such operation during sudden changes in speed or for all operating conditions. Moreover, the slight movement of the piston will soon cause a circumferential groove to be formed in the cylinder wall which will make the maintenance of an effective seal between the piston and cylinder impractical, if not impossible, and the resultant leakage will render the automatic control of the engine entirely ineffective under all conditions.

Consequently, the primary object of this invention is to provide a vacuum responsive regulating means operatively associated with the pump control means in such a manner that the aforementioned defects are entirely eliminated.

Another object is to construct a vacuum responsive regulator embodying a novel arrangement of parts, particular reference being had to the manner of mounting and adjusting the springs biasing the piston whereby the regulator is rendered extremely sensitive, durable and can be readily adjusted to conform with all conditions under which the engine may operate.

Still another object is to provide a novel, adjustable means connecting the vacuum responsive regulator and the pump control means so that the movement of the regulating piston is materially greater than the resultant movement of the pump control means and the relative positions of the piston and the control means can be varied at will to obtain either the proper metering of the fuel or to entirely terminate the feeding of fuel.

Still another object is to construct a vacuum responsive regulating arrangement in which the relatively large piston movement together with the use of a plurality of readily flexible springs results in the piston movement closely assimilating the substantially hyperbolic, fuel vacuum curve obtained by plotting fuel quantities as ordinates against inches of vacuum as abscissa.

The invention accordingly consists in the various features of construction, combinations of elements and arrangement of parts as more particularly pointed out in the appended claims and in the detailed description, reference being had to the accompanying drawings, in which:

Fig. 1 is a diagrammatic, elevational view of an engine embodying the invention;

Fig. 2 is a vertical section of the regulating mechanism illustrated in Fig. 1 taken on line II—II of Fig. 3;

Fig. 3 is a sectional view of the regulating apparatus taken on line III—III of Fig. 2;

Fig. 4 is a vertical sectional view of a modified form of regulating apparatus taken on line IV—IV of Fig. 5; and Fig. 5 is a section of a regulating apparatus taken on line V—V of Fig. 4.

Fig. 6 shows an actual hyperbolic fuel or air vacuum curve for an engine with the straight line curve of piston displacement superimposed thereon.

Referring to Fig. 1 of the drawings, I designates a conventional internal combustion engine having an ordinary fuel injection pumping unit 2, employing a pump for each engine cylinder (not shown), delivering fuel under pressure through the pipes 3 to the engine cylinders 4 and having a control rod or shaft 6 operative to vary the pumping action in a well known manner, such for example, as by rotating the pump plungers to thereby control a bypass, or by varying the stroke of the pump plungers, or by varying the time during which the intake valve remains open. The engine includes the usual intake manifold 7 having a throttle valve 8, which may be operated by a speed responsive governor or by any other well known means, and an air cleaner 9 attached to the outer end of the manifold. Operatively associated with the intake manifold by means of pipes 11 and 12 and with the pump control rod or shaft 6, by means of a linkage mechanism designated generally by the numeral 13, is a vacuum responsive regulating means 14, of the form illustrated in detail by Figs. 2 to 5 inclusive and which operates in response to the variations in vacuum in the intake manifold to correspondingly regulate or vary the pumping action so that the fuel-air ratio is maintained substantially constant throughout the entire operating range of the engine.

The form of regulating device illustrated in Figs. 2 and 3, particular reference being had to Fig. 2, comprises a casing 16 forming an open ended cylinder 17 which is effectively sealed at one end by an elongated piston 18, whose outward movement is limited by stops 19, and at the opposite end by a removable cover 21, secured in position by any well known means not shown, and having an inwardly extending, axially bored portion 22 providing, near the cover, a spring seat and retaining portion 23 and with its inner end forming a guide 24 on which is slidably mounted a spring retainer 25. A pair of springs 26 and 27 are serially and cooperatively arranged within the cylinder 17; the relatively weak spring 26 having one end mounted on and engaging the spring seat and retaining portion 23 to be carried thereby and with its other end loosely entering a recess 28 in the spring retainer 25 and abutting thereagainst; and a relatively strong spring 27 having its inner end mounted on and engaging a spring retaining seat 29 formed on the retainer 25 with its other end abutting the inner surface of the piston head. The axial bore 31 on the portion 22 has an internally threaded, enlarged outer end 32 and extending through this bore is a rod 33 functioning as a piston stop and having an enlarged externally threaded outer end 34 cooperating with the internally threaded portion of the bore for axial adjustment of the rod; the enlarged threaded portion of the bore also receiving an externally threaded, locking and sealing plug 36, which abuts the outer end of rod 33. The cylinder 17 intermediate the piston and cover is provided with an inlet passage 37 (see Fig. 2) providing a connection for the pipe 12 so that the interior of the cylinder is subjected to the vacuum within the intake manifold.

The linkage mechanism 13, which operatively and adjustably connects the pump control rod or shaft 6 with the piston 18 comprises a shaft 38 rotatably mounted in bearings 39, 41 formed in opposite walls of the casing 16 and at one side of the cylinder 17. An upwardly extending arm 42 is rigidly secured to the shaft 38 and is connected at its upper end to a link or rod 43 (see Fig. 1) for manually or otherwise actuating shaft 38; a downwardly extending arm 44 is secured to shaft 38 for movement therewith, the shaft 38 and arms 42 and 44 constituting in effect a bell crank. A link 46 is pivotally connected near one end, by any suitable means, to the pump control shaft 6 with its adjacent end pivotally connected to arm 44 by means of a link 47 and pivot pin 50 and its other or remote end pivotally connected to the piston 18 by means of a link 48. Formed within the casing 16 is a second cylinder 49 having an open end which is substantially closed by an elongated piston 51 having a vent passage 52 therein. A strong spring 53 is interposed between the closed end of the cylinder and the piston 51 and urges the latter into engagement with one side of arm 44, thereby tending to move said arm towards the right as viewed in Fig. 2. A cover member 54, which is connected to the atmospheric side of the throttle valve 8 by means of a connection 45 and pipe 11 and through which the pump control shaft 6 extends, encloses the linkage mechanism and carries, by means of a boss 56, an adjusting screw 57 engaging the other side of arm 44 whereby the position to which it is urged by the piston 51 may be varied at will.

Consequently, since the stops 19 limit the outward movement of the piston, movement of the adjusting screw 57 outwardly of the boss 56 will vary the position of the adjustable fulcrum 55 and correspondingly vary the position of the pump control shaft or rod 6 relative to the piston 18. In a like manner, movement of the adjusting screw 57 inwardly of the boss will effect a corresponding and opposite relative adjustment of parts; the arrangement being such that the movement of the piston 18 or the adjusting means to effect the movement of the pump control shaft 6 to the left, as viewed in Fig. 2, decreases the pumping action and/or the rate of fuel feed, while movement in the opposite direction increases fuel feed. Moreover, since the outward movement of piston 18 is limited by stops 19, actuation of the arm 42 will cause the arm 44 to move piston 51 against the bias of spring 53 to correspondingly move the fulcrum 55 of link 46 and the control rod or shaft 6 so that the operation of the pumping unit may be terminated at the will of the operator. Furthermore, it should be noted that the point of connection of the control rod or shaft 6 with the link 46 is such, relative to the connection of the latter with the fulcrum and the piston 18, that the movement of the piston in response to variations in vacuum in the intake manifold is materially greater than the resulting movement of the control rod or shaft 6. Moreover, the arrangement is such that movement either of the piston or the adjustable fulcrum will not result in the control shaft 6 being subjected to any side thrust.

The use of serially arranged biasing springs for the piston 18 enables the piston movement to more nearly assimilate the substantially hyperbolic curve obtained by plotting either the quantity of fuel or the quantity of air as ordinates against the vacuum in the intake manifold as abscissa.

The form of governing device illustrated in Figs. 4 and 5 is somewhat similar to that shown in Figs. 2 and 3 and the corresponding parts are designated by the same reference numerals as follows: regulator casing 16, cylinder 17, its vacuum connection 37, a vacuum responsive piston 18, piston stops 19, the links 46, 47 and 48 interconnecting the adjustable fulcrum, piston and the pump control shaft, the pump shaft or rod 6, cover 54 for the linkage mechanism and its connection 45 for the pipe 11.

In this modification the casing 16 has formed therein adjacent the cylinder 17, an open ended chamber 58, the corresponding ends of the cylinder 17 and chamber 58 being sealed by a cover 59, secured in position by any suitable means not shown, which has an axially bored portion 61 extending into the chamber 58 and slidably mounting a rod 62 formed adjacent its inner end to provide a spring seat 63 and with its inner end pivotally connected by any suitable means 64 to the link 47. A spring 66 surrounds rod 62 and the inwardly extending portion 61 with one end abutting the inner side of the cover 59 and its opposite end abutting the seat 63 so that the rod is biased toward the right as viewed in Fig. 4. The outer end of rod 62 is threaded to receive adjusting and locking nuts 67, which limit its movement in response to the action of spring 66 and a connection 68 for attaching a rod or cable for moving the rod 62 outwardly against the action of spring 66.

The portion of the cover 59 overlying the cylinder 17 has a central, internally threaded bore receiving an externally threaded inwardly extending and axially adjustable member 71 having its inner end formed to provide a spring seat and retaining portion 72 and, on its outer portion, the adjusting and locking nuts 73. The piston 18 has an inwardly extending spring guide and stop member 74 which cooperates with the spring seat and retaining portion 72 to mount an inner, relatively strong spring 76 and to limit the inward movement of the piston 18; the spring 76 being carried by the member 71 and adjustable therewith to vary its position relative to the inner surface of the piston head. Concentrically positioned within the cylinder 17 is a second relatively weak spring 77 having one end abutting the cover 59 and its other end abutting the inner surface of the piston head.

The connection 64 between rod 62 and link 47 constitutes an adjustable fulcrum corresponding in all material respects to that shown in Fig. 2; its adjustment being accomplished by means of the threaded portion on rod 62 and the nuts 67 instead of by the screw 57 and its operation and effect upon the control rod or shaft 6 and the piston 18 is identical.

The relatively large movement of the piston in connection with concentric spring arrangement in which the relatively weak spring 77 is always engaging the piston 18 and the strong spring 76 only engages and affects the piston movement after a predetermined compression of the weak spring produces the same result of curve assimilation as does the serially arranged springs 26 and 27 in the first described form.

Referring to the curve shown in Fig. 6, which is an actual reproduction of an engine air vacuum curve obtained by plotting air quantities as ordinates against the negative pressure or vacuum within the manifold on the engine side of the throttle valve as abscissa throughout the operating range of the engine, it will be obvious that in order to maintain a substantially constant fuel-air ratio throughout the operating range of the engine, the rate of fuel feed or the pumping action must be varied accordingly. Consequently, if the rate of fuel feed or the pumping action is to be so varied directly by means of a device actuated by the negative pressure within the intake manifold, i. e. by a force equal to the difference in pressure existing on opposite sides of the throttle valve, it necessarily follows that the curve or the locus of piston displacement must assimilate the substantially hyperbolic air vacuum curve. Moreover, since the vacuum or the negative pressure within the manifold is obviously a direct measure of the pressure or force exerted on the piston, it is also obvious that the portion of the ordinates lying above the substantially hyperbolic air vacuum curve shown in Fig. 6 may, if the locus of piston displacement is to assimilate such curve, be considered as representing piston displacement and the abscissa as representing the actual force or pressure causing such displacement and that the following relations exist:

(a) The rate of air flow varies inversely with the vacuum;

(b) The pressure or force which actuates the piston varies directly with the vacuum;

(c) The piston displacement varies inversely with the rate of air flow; and (d) The piston displacement varies with the actual force or the pressure causing such displacement.

Therefore, it should be obvious that if, as the load decreases and the vacuum increases, displacement of the piston 18 is resisted first by a relatively weak spring 26 having a force compression curve represented by the straight line designated A in Fig. 6 until such spring is either fully compressed or further compression thereof prevented and thereafter by a relatively strong spring 27 having a force compression curve represented by the straight line designated B in Fig. 6, the curve or the locus of piston displacement will closely assimilate the substantially hyperbolic air or fuel vacuum curve throughout the operating range of the engine. In a like manner, if displacement of the piston 18 is resisted first by a relatively weak spring 77 having the same force compression curve as the spring 26 and thereafter by the combined action of said weak spring and a relatively stronger spring 76 having a force compression curve such that the combined effect results in a curve of piston displacement represented by the straight line designated B in Fig. 6, it should also be obvious that this arrangement will produce a curve or a locus of piston displacement identical to that represented by the straight line portions A and B of Fig. 6.

The operation of the previously described devices may be briefly summarized as follows: With the engine operating under full load conditions, the throttle valve 8 is fully open, the pressure on either side of the throttle valve is substantially equal and, therefore, the vacuum effect in the manifold is substantially negligible, the regulating parts will be in the relative positions shown in Figs. 2 to 5 inclusive and the rate of fuel feed a maximum. However, as the load decreases and the throttle valve is moved towards its closed position, the vacuum in the manifold will increase and, as a result, the vacuum responsive piston 18 will move to the left as viewed in Figs. 2 and 4 to proportionately decrease the pumping action and/or the rate of fuel feed; the changes in the vacuum always producing a corresponding and proportional change in the rate of fuel feed.

The use of a linkage mechanism which eliminates side thrust being imparted to the control shaft, that is readily adjustable at all times and which permits the movement of the piston being materially greater than the resultant movement of the control rod, allows the use of a readily flexible biasing spring, thus rendering the regulator extremely sensitive even to the slightest variations in the vacuum throughout the entire range of engine operation and its movement to closely approximate the substantially hyperbolic, fuel vacuum curve. The use of an elongated piston provides an effective seal, without the use of packing, prevents any tendency of the piston to tilt, thus eliminating the use of an additional guiding means for the piston stem, and the particular spring mountings employed facilitates the construction, assembly and adjustment of the regulating device.

The foregoing features of construction and arrangement cooperate to provide an extremely sensitive, readily adjustable, and durable regulator which greatly improves the operation and efficiency of the engine under all conditions.

It should be understood that it is not desired to limit the invention to the exact details of construction and operation herein shown and described for various modifications within the scope of the claims may occur to persons skilled in the art.

It is claimed and desired to secure by Letters Patent:

1. In a combination comprising a fuel injection pumping unit for internal combustion engines having a reciprocable pump control element operative to vary the quantity of fuel delivered, a means comprising a reciprocable member movable parallel to said element, connections for rendering said member responsive to changes in vacuum in the intake manifold, and means connecting said control element and member, a fulcrum biased to a predetermined position for maintaining said connecting means operatively associated with said control element and member so that the resulting movement of the element is always materially less than the movement of the member and the force exerted by said member to cause said movement is applied axially to said element.

2. In a combination comprising a fuel injection pumping unit for internal combustion engines having a reciprocable pump control element operable to vary the quantity of fuel delivered, a means comprising a reciprocable member movable parallel to said element, connections for rendering said member responsive to changes in vacuum in the intake manifold, means connecting said control element and member, a fulcrum biased to a predetermined position, and adjustable means coacting with said fulcrum and operable to change said predetermined position and thereby vary the position of said control element relative to said member.

3. In a combination comprising a fuel injection pumping unit for internal combustion engines having a reciprocable pump control element operative to vary the quantity of fuel delivered, a vacuum responsive means comprising a reciprocable member movable parallel to said element and biasing means therefor constructed and arranged so that the movement of the member in response to small variations in vacuum is comparatively large and means connecting said member and control element, a fulcrum biased to a predetermined position for maintaining said connecting means operatively associated with said control element and member so that the resultant movement of the control means is materially less than the movement of said member and the force exerted by said member to cause such movement is applied axially to said element.

4. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, an elongated piston adjacent to and effectively sealing one end and having an axially extending motion transmitting connection, a cover sealing the other end and having a portion extending inwardly towards said piston, a spring retainer slidably mounted on said portion, means for subjecting the interior of the cylinder to the vacuum in the intake manifold, and serially arranged springs within said cylinder between said piston and cover with their adjacent ends abutting opposite sides of said retainer.

5. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, a piston adjacent to and effectively sealing one end and having an axially extending motion transmitting connection, a cover sealing the other end and having a portion extending inwardly towards said piston, a spring retainer slidably mounted on said portion, serially arranged springs within said cylinder between said piston and cover with their adjacent ends abutting opposite sides of said retainer, means for subjecting the interior of the cylinder to the vacuum in the intake manifold, and a piston stop carried by said cover and adjustable axially of said cylinder.

6. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, a piston adjacent to and effectively sealing one end, a cover sealing the other end and having an axially bored portion extending inwardly toward said piston, a spring retainer slidably mounted on said portion, serially arranged springs within said cylinder between said piston and cover with their adjacent ends abutting opposite sides of said retainer and a piston stop mounted for axial adjustment in said bore and extending beyond the inner end of said portion.

7. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, a piston effectively sealing one end, a cover sealing the other end, inner and outer springs disposed between said cover and piston with only one spring initially contacting said piston, means carried by the cover and movable longitudinally of the cylinder for varying the position of the other spring relative to the piston and means for subjecting the interior of the cylinder to the vacuum in the intake manifold.

8. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, an elongated piston effectively sealing one end and having an inwardly extending portion forming a spring guide, a cover sealing the other end and carrying an inwardly extending, adjustably mounted spring retainer, a spring disposed between said piston and cover, a second spring carried by said retainer and positioned by said retainer and guide out of contact with the piston head, and means for subjecting the interior of the cylinder to the vacuum in the intake manifold.

9. In a fuel regulating apparatus for maintaining a substantially constant fuel air ratio, a pressure device having a reciprocable element whose movement in response to the variations in pressure in the intake manifold conforms with the substantially hyperbolic fuel vacuum curve comprising an open ended cylinder, an elongated piston effectively sealing one end and having an inwardly extending portion forming a spring guide, a cover sealing the other end and carrying an inwardly extending, adjustably mounted spring retainer, means for subjecting the interior of the cylinder to the vacuum in the intake manifold, and concentrically arranged springs one being disposed between said cover and piston and the other being carried and positioned by said retainer and guide out of contact with the piston head, the arrangement being such that the piston movement in response to small variations in vacuum is comparatively large.

10. In a combination comprising a fuel injection pumping unit for internal combustion engines having a longitudinally movable control element operable to vary the pumping action and a means comprising a reciprocable piston movable parallel to said element in response to variations in the manifold pressure, a link extending transversely of the direction of movement of said element and piston and pivotally connected to said element near one end with its other end pivotally connected to said piston and a movable biasing means cooperating with said one end to form an adjustable fulcrum for maintaining said piston and element operatively associated so that the movement of the piston is always parallel to and materially greater than the resulting movement of the control element.

11. In a combination comprising a fuel injection pumping unit for internal combustion engines having a movable control element operable to vary the pumping action and a means having a member movable in response to variations in manifold pressure, means connected to said element and member at spaced points and a movable biasing means cooperating with said means near its point of connection with said element to form an adjustable fulcrum for maintaining said element and member operatively associated so that the movement of the member is always materially greater than the resulting movement of the control element.

WALTER G. CHARLEY.

CERTIFICATE OF CORRECTION.

Patent No. 2,134,658.   October 25, 1938.

WALTER G. CHARLEY.

It is hereby certified that error appears in the printed specification of the above numbered patent requiring correction as follows: Page 4, first column, line 26, claim 1, for the word "said" read such; line 37, claim 2, after "position" and before the comma insert the words for maintaining said connecting means operatively associated with said control element and member so that the resulting movement of the element is always materially less than the movement of the member and the force exerted by said member to cause such movement is applied axially to said element; and that the said Letters Patent should be read with this correction therein that the same may conform to the record of the case in the Patent Office.

Signed and sealed this 6th day of December, A. D. 1938.

Henry Van Arsdale (Seal)   Acting Commissioner of Patents.